Nov. 15, 1949  R. F. HABERMAN  2,488,187
LAND LEVELER
Filed June 20, 1947  2 Sheets-Sheet 1
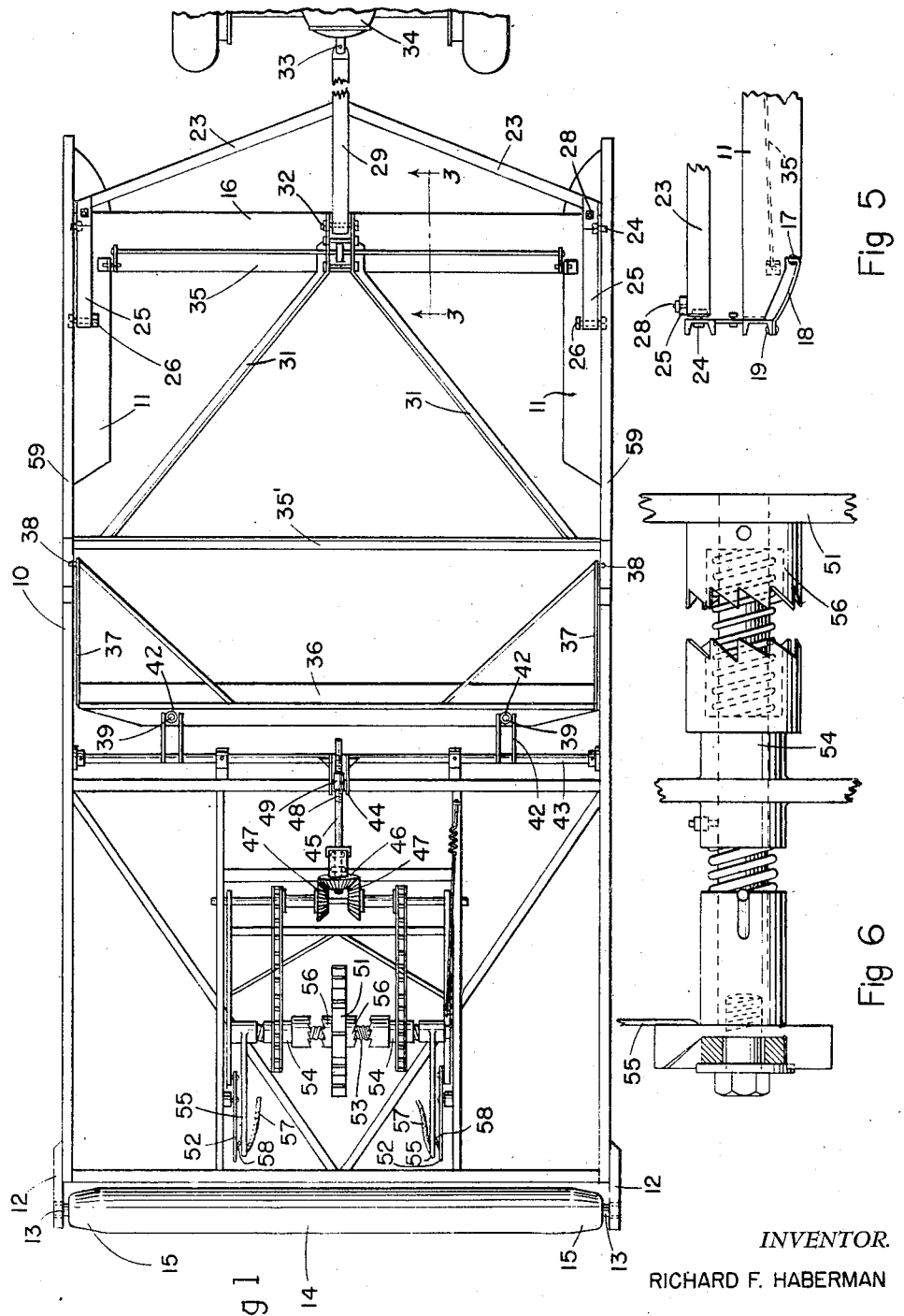
INVENTOR.
RICHARD F. HABERMAN
BY *Victor J. Evans & Co.*
ATTORNEYS Nov. 15, 1949  R. F. HABERMAN  2,488,187
LAND LEVELER
Filed June 20, 1947  2 Sheets-Sheet 2
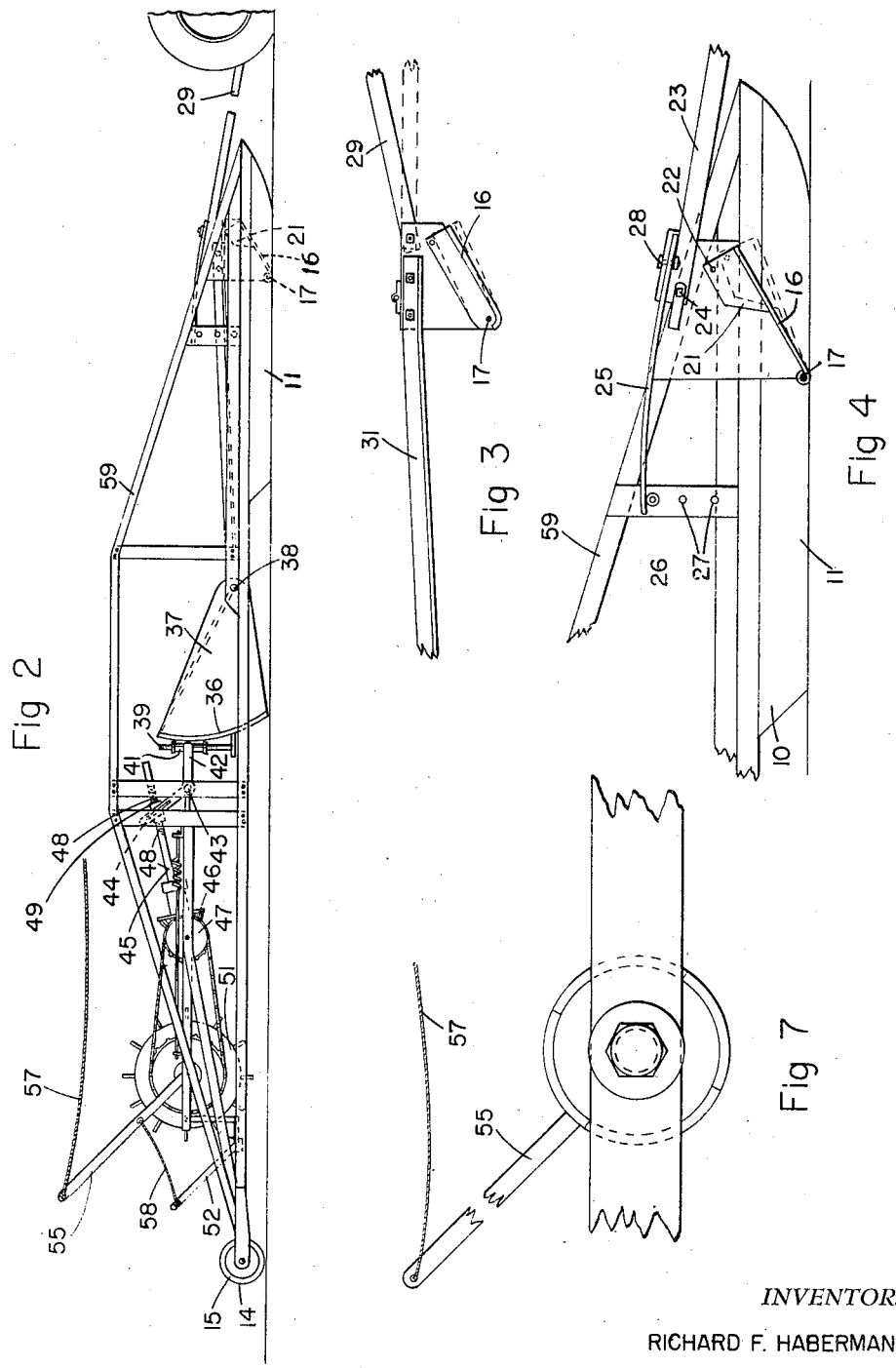
INVENTOR.
RICHARD F. HABERMAN
BY *Victor J. Evans & Co.*
ATTORNEYS Patented Nov. 15, 1949

2,488,187

UNITED STATES PATENT OFFICE 2,488,187

LAND LEVELER

Richard F. Haberman, Powell, Wyo.

Application June 20, 1947, Serial No. 756,018

3 Claims. (Cl. 37—146)

This invention relates to a land leveling machine.

It is an object of the present invention to provide a land leveling machine adapted to be pulled by a tractor or the like which has a wide skid which will cause the forward end of the machine to ride up when a large obstruction is found and wherein there is provided a hitch connection with the frame of the leveling machine which will permit the tractor to assume a part of the load of the forward end of the machine so that the skid will bear only lightly upon the ground to be leveled or scraped.

It is another object of the present invention to provide a land leveling machine with a forward skid which extends the full width of the front of the machine and which has end formations which turn upwardly so as to permit the easy turning of the machine at the end of its course and wherein the roller which supports the rear of the machine extends the full width and has its ends tapered to facilitate the turning of the rear portion of the machine, whereby to eliminate the tendency to dig up the ground upon the turning of the machine.

Other objects of the present invention are to provide a land leveling machine which is of simple construction, inexpensive to manufacture and efficient in operation.

For other objects and for a better understanding of the invention, reference may be had to the following detailed description taken in connection with the accompanying drawing, in which Fig. 1 is a plan view of my land leveling machine connected to the tractor.

Fig. 2 is a side elevational view of the machine shown in Fig. 1.

Fig. 3 is a fragmentary cross-sectional view taken on line 3—3 of Fig. 1.

Fig. 4 is a fragmentary side elevational view of the front end structure of the machine.

Fig. 5 is a fragmentary front end view taken of one side of the machine.

Fig. 6 is an enlarged fragmentary view of the clutch mechanism for effecting the operation or lifting of the shovel.

Fig. 7 is a fragmentary side elevational view of the mechanism for effecting the actuation of the clutch with the operating arm extending therefrom.

Referring now to the figures, 10 represents a large frame having front end side skids 11 on which the front of the frame is mounted. At the rear of the frame are rearwardly extending bearing brackets 12 for receiving projections 13 of a long supporting roller 14 at the rear of the frame. This roller 14 is tapered at each end as indicated at 15 to facilitate the turning of the machine and to eliminate the tendency for the end of the roller to dig into the earth at this time.

Between the sides of the forward end of the frame there is extended a blade 16 which has its front edge raised so that the front portion of the frame may be lifted as the blade rides upwardly over any ground projection on the ground surface. Accordingly the front end of the machine will float over the ground with a minimum of drag, with little scraping or leveling action performed by blade 16. The blade 16 is pivotally connected as indicated at 17 to an end bracket 18 which is fixed to the under portion of the frame as indicated at 19 and bracket 18 is rounded to provide a good lifting surface for the end of the blade as the leveling machine is turned. This bracket or plate 18 will prevent the end of the blade 16 from entering the earth as the machine is turned. On the blade 16 are upstanding projections or plate portions 21 with holes 22 therein through which a bolt can be extended to retain the blade 16 at different angles of inclination. The retaining bolts will extend into the sides of the frame.

Extending forwardly of the blade are draft members 23 which are pivotally connected to the sides of the frame at their rear ends by pivot bolts 24 and which have on their rear ends leaf springs 25 adapted to bear at their rear ends against stops 26 at the sides of the frame. The stops 26 can be inserted in any one of several holes 27. The leaf springs 25 are fixed to the draft members 23 as indicated at 28.

A central draft member 29 is pivotally connected to brackets or forwardly converging members 31 as indicated at 32. The members 23 are connected with the member 29 at a forward location thereon. The member 29 is hitched as indicated at 33 to a tractor 34. With the hitch connection having been effected with the tractor, the front end of the machine will be supported upon the springs 25 whereby to give the same only light engagement with the ground.

The sides of the frame 10 are connected together by a tie rod arrangement 35 which extends through the forward ends of the converging members 31. The converging members 31 are connected at their rear ends to a transversely extending frame member 35'.

In rear of the transverse member 35' there is connected a scoop or leveling blade 36 having side plates 37 pivotally connected as indicated at 38 with the sides of the frame 10. On the rear of the blade 36 is a threaded projection 39 extending vertically upwardly and having a sleeve 41 adjustable thereover. There is a sleeve 41, positioned adjacent the opposite ends of the blade, and to each sleeve 41 there is connected an arm 42 fixed to a shaft 43 which in turn is connected to the sides of the frame for rotatable adjustment. An arm 44 extends upwardly from the shaft 43 centrally thereof and to this arm there is adjustably and pivotally connected a rod 45 which has a bevel gear 46 on its rear end meshing with bevel gears 47 located respectively at opposite sides of the gear 46. The rod 45 has threads 48 thereon and as the same is turned it will be adjusted through a sleeve 49 on the arm 44 whereby to cause the lifting of the blade 36.

A ground engaging wheel 51 is adapted to be lowered by a hand lever 52 for engagement with the ground. This wheel will be rotated and shaft 53 having reverse threads thereon will be rotated. On the threaded portions of the shaft 53 and at opposite sides of the ground engaging wheel 51 are clutch sleeves 54 which are connected by a chain and sprocket arrangement with bevel gears 47. By operating either one of hand levers 55, the clutch sleeve 54 will be brought into engagement with a clutch element 56 on the ground engaging wheel 51 whereby to effect either a lifting or lowering of the blade 36. Ropes 57 extend forwardly to the tractor and a rope 58 connects the lever 55 with the ground wheel adjusting lever 52. A truss structure 59 is provided on the top of the frame to reinforce the same and to prevent it from buckling in the middle.

While various changes may be made in the detail construction, it shall be understood that such changes shall be within the spirit and scope of the present invention as defined by the appended claims.

I claim:
1. A land leveling machine comprising a frame having a front portion with skids thereon, a scraper adjustably connected to the frame and means for raising and lowering the scraper on the frame, and a second blade extending across the front of the frame from one side to the other and inclined upwardly and forwardly so as to ride over any projections on the ground, a draft structure secured to the front portion of the frame for connecting the same to a tractor or the like, and said draft structure comprising draft members extending to the sides of the frame and pivotally connected thereto, leaf springs extending respectively at the opposite sides of the frame and from the draft structure, and projections on the sides of the frame for receiving the free ends of the leaf springs whereby when the draft structure is connected to the tractor the forward end of the machine will be floatingly retained to engage the ground in an easy manner and such that the front of the machine can be easily raised when projections are encountered on the ground.

2. A land leveling machine as defined in claim 1, and a bracket plate connected at each side of the frame and serving to prevent the forward transversely extending blade from entering the ground as the machine is turned, and said blade being pivotally adjustably connected to the inwardly extending bracket plates at the sides of the frame.

3. A land leveling machine as defined in claim 1, and a long roller extending across the rear of the frame and journalled thereon for supporting the rear end of the machine, said roller having its ends tapered to prevent the same from digging up the ground as the machine is turned about.

RICHARD F. HABERMAN.

REFERENCES CITED

The following references are of record in the file of this patent:

UNITED STATES PATENTS

| Number | Name | Date |
| --- | --- | --- |
| 1,442,796 | Detwiler | Jan. 23, 1923 |
| 2,189,962 | Rae et al. | Feb. 13, 1940 |